2,877,191

CATION EXCHANGE RESIN MEMBRANES BY HYDROLYSIS OF STYRENE SULFONIC ESTER OR AMIDE COPOLYMERS

William Frederick Graydon, Weston, Ontario, Canada

No Drawing. Application July 14, 1954
Serial No. 443,413

4 Claims. (Cl. 260—2.2)

This invention relates to an ion exchange resin of homogeneous structure and high tensile strength adapted for the formation of sheets, tubes and the like and to the method of making ion exchange resins of the addition polymer class as disclosed herein.

Prior cation exchange membranes have not been made from addition polymers to provide a uniform structure in the membrane.

Heretofore, cation exchange membranes have been prepared, for example, by sulfonation of a substantially polymerized compound. Either the resin particles become completely sulfonated or sulfonation is confined substantially to the surface of the particles. Therefore, it is not possible to prepare a resin having a small number of sulfonate groups uniformly distributed throughout the resin. Accordingly, the prior art does not provide a uniformly substituted cation exchange resin of relatively low capacity.

It is an object of the invention to provide an addition polymer ion exchange resin of homogeneous structure.

It is another object of the invention to provide a uniform dispersion of ion exchange groups in an ion exchange resin having an addition polymer base.

It is a further object of the invention to provide a method of forming an addition polymer ion exchange resin in which the ion exchange groups are uniformly distributed throughout the resin and in which the degree of ion exchange group substitution can be varied or controlled.

It is a further object of the invention to provide a novel structure of ion exchange resin of the class set forth adapted to be formed into granules of distinct properties as to ion exchange capacity and in which the capacity and cross linking can be varied independently.

It is a further object of the invention to provide a novel structure of ion exchange resin of the class set forth adapted to be formed into membranes of relatively high tensile strength and of distinct properties of membrane potential and ionic mass transfer.

It is a further object of the invention to provide a method of making unsupported ion exchange membranes of the addition polymer class.

It is a still further object of the invention to provide addition polymer ion exchange resins in granular form.

The invention also has for its object, the preparation of ion exchange materials from a plurality of monomers, one of which is a compound containing both a grouping which can undergo addition polymerization and an ionogenic substituent group which may be, or may be converted to, an ion exchange group after polymerization. The other monomers must be compatible and to this end contain a grouping adapted for addition polymerization. The thus identified components are readily recognized by skilled persons as those containing vinyl groups, butadiene molecules, styrene, and the like, all of which contain a grouping which for purposes of this disclosure is defined as a vinyl grouping, that is to say, the phrase "vinyl grouping" in this disclosure shall mean the active grouping in any compound which will undergo addition polymerization. Thus compounds containing polymerizable ethylenic linkages adapted for addition polymerization, for example, vinyl groups, styrene and its derivatives, butadiene, maleic anhydride, and ethylene oxide are intended to be identified by the phrase "compounds containing a vinyl grouping." Some compatible monomers may be employed as cross linking agents whereby the tensile strength of the resulting ion exchange material may be controlled. Other compatible monomers may be employed as diluents as will be apparent from the following more detailed specification setting forth the preferred practice of the invention.

In its preferred practice the process of the invention employs two main reaction components for forming the ion exchange resin and wherein one of the components is sulfonated prior to combination with the other component.

It is first desirable to outline the preparation of the monomer constituent containing an ionogenic substituent group and characterized by a grouping which can undergo addition polymerization. The following examples illustrate the manner in which substances falling within this definition may be prepared.

PREPARATION OF MONOMERS

*Example I.—p-(β-Bromoethyl)-benzenesulfonylchloride*

180 gms. of β-phenylethylbromide were reacted with 500 ml. of chlorosulfonic acid essentially in accordance with the procedure of Inskeep and Deanin (8), except that the temperature was maintained at 3–5° C. The product was extracted with ether, crystallized at Dry Ice temperature and recrystallized rapidly from dry methanol. The yield was 160 gms. (56%), M. P. 54–55° C.

*Analysis.*—C, 34.16%: H, 2.89, 2.90%: S, 11.46, 11.50%.

*Example II.—n-Propyl-p-(β-bromoethyl)-benzenesulfonate*

One hundred grams of p-(β-bromoethyl)-benzenesulfonylchloride were suspended in 200 gm. of n-propanol and allowed to stand until the solid had dissolved. The solution was neutralized slowly at 10° C. with 6 N aqueous sodium hydroxide solution. The propyl ester separated as an oil. The suspension was diluted to 500 cc. with cold water. The aqueous layer was saturated with sodium chloride and the oil was extracted with ether. The ether solution was washed with cold water, dried, concentrated in vacuum in the cold and the ester distilled at $1\mu$ in a Hickman still. The yield was 85.5 gms. (80%), M. P. 6–8° C., $n_d^{26}$ 1.5442 $d_{25}^{25}$ 1.385.

*Analysis.*—C, 43.63%, 43.48%: H, 5.17%, 5.01%: S, 10.30%, 10.57%: Br., 25.97%, 25.80%.

*Example III.—n-Propyl-p-vinylbenzenesulfonate*

Fifty-five grams of n-propyl-p-(β-bromoethyl)-benzene-sulfonate were dissolved in 120 cc. of ethanol and heated to 50° C., 11.5 gm. of potassium hydroxide dissolved in 140 cc. of ethanol at 50° C. were added. The reaction mixture was diluted to 500 cc. with cold water and the ester was extracted with ether. A trace of tertiary butyl catechol was added to the solution, which was then dried. The ether was removed in vacuum in the cold and the ester distilled at $1\mu$ in a Hickman still. A yield of 23.7 gms. (55%) of the colourless liquid product was obtained, $n_d^{25}$ 1.5374, $d_{15}^{25}$ 1.165. Attempts to crystallize were unsuccessful.

*Analysis.*—C, 58.10%, 58.04%: H, 6.26%, 6.40%: S, 14.15%, 14.27%.

A number of similar esters, which are listed hereinafter, were prepared by the method given above. Purification was found to be difficult because of decomposition and polymerization. Both the crude and purified product were used for the preparation of ion exchange resins of the invention.

Example IV.—Methyl-p-(β-bromoethyl)-benzenesulfonate

Using 85 gms. of p-(β-bromoethyl)-benzensulfonyl chloride, 45.0 gms. (75%) of white solid was obtained. After recrystallization from petroleum ether (B. P. 80–100° C.) the solid melted at 66–66.5° C.

*Analysis.*—C, 38.74%, 38.83%: H, 4.04%, 4.20%: S, 11.65%, 11.75%: Br., 28.64%, 28.38%.

The ethyl and butyl esters of p-vinylbenzenesulfonic acid were also prepared. Both these products were oils which were difficult to purify. In both cases, traces of bromine were found in the final product and in both cases, this impure product was used for polymerization. The major impurity was therefore bromide which does not materially interfere with polymerization in the quantity occurring.

The foregoing methods are designed to produce materials of high purity for identification and experimentation. Various improved laboratory procedures have been developed as follow:

Example V.—Preparation of propyl ester of styrenesulfonic acid 1 mol. of p-(β-bromoethyl)-benzenesulfonic chloride is mixed with 1.2 equivalents of primary propyl alcohol at 15° C. 1 mol. of pyridine is slowly added. The propyl ester of p-(β-bromoethyl)-benzenesulfonic acid is formed Without separation of the ester the product is treated with another one mol. of pyridine and heated to 50° C. After a period of 10 to 30 minutes the product is washed with ice cold water, extracted with peroxide free ether and dried over anhydrous $Na_2SO_4$. Ether excess of pyridine and excess of n-propyl alcohol is distilled off under vacuum. Inhibitor (tert-butyl catechol) is added and by molecular distillation (1 gm. and 70° C.) pure n-propyl-p-vinyl benzene sulfonate is obtained. The yield is 69%.

Example VI 100 g. of p-(β-bromoethyl) benzene sulfonyl chloride is dissolved by heating in 50 gm. of n-propyl alcohol. Cooled to 10° C. and neutralized with 60 ml. 6N.NaOH. The mixture is diluted with ice cold water and the ester is extracted with ether and dried over anhydrous $Na_2SO_4$. After evaporation of the ether the yield of crude n-propyl ester of p-(β-bromoethyl) benzene sulfonic acid is 95 gm. (88%).

To 95 gm. of ester in 50 ml. of n-propyl alcohol 18 gm. of KOH in 180 ml. of n-propyl alcohol is added at 50° C. The product is diluted with ice cold water, extracted with peroxide free ether and dried over anhydrous $Na_2SO_4$. Inhibitor (tert-butyl catechol) is added and by molecular distillation 44 gm. of pure n-propyl-p-vinyl benzene sulfonate is obtained. The yield is 59%.

The method of purification of p-(β-bromoethyl)-benzenesulfonyl chloride is given as crystallization at Dry Ice temperature. A preferable industrial procedure for this purification is by crystallization of the potassium or organic base salt at room temperature. Another alternative is the use of the methyl ester of the bromide compound to purify by crystallization.

Purification of the final ionogenic monomer may be undertaken by distillation in a Hickman still. Industrially, this purification may be done by a molecular distillation, or it may be omitted altogether. Ion-exchange materials of essentially the same properties have been made from both the distilled and the undistilled monomer.

ION EXCHANGE RESIN FORMATION

The foregoing examples illustrate the preparation of one monomer constituent containing a grouping which can undergo addition polymerization and an ionogenic substituent group.

The ion exchange resin of the invention is prepared by copolymerization of this monomer with a monomer or monomers containing a vinyl grouping. Such other component contains a monomer or monomers preferably characterized by a polyvinyl grouping and more specifically a di-vinyl grouping such as di-vinyl benzene.

Suspension copolymers of styrene, divinylbenzene and the monomers of the foregoing examples were prepared according to the following example, based on monomer mixtures totalling 100 gm.

Example VII

The monomers containing 1 gm. of benzoyl peroxide were added to 1000 ml. of the stabilizing solution, in a three-necked standard taper flask fitted with a reflux condenser and stirrer. The stabilizing solution contained 0.1% hydroxy-ethyl cellulose (Cellosize WPL$_H$). The speed of the stirrer was adjusted to give beads of the desired size (1 mm. or larger) and the temperature was maintained at 90° C. When the beads had hardened, agitation was stopped and heating continued for an additional 40 hours. The copolymer of p-vinylbenzene-N,N'-dimethylsulfonamide was hydrolyzed for 120 hours with 25% hydrochloric acid under reflux. The ester copolymers were hydrolyzed with 5% sodium hydroxide. The copolymers were then conditioned with 2 N sodium chloride and 2 N hydrochloric acid, thoroughly rinsed, and the capacities determined by the addition of 2 N sodium chloride to a known weight of exchanger and titration with 0.1 N sodium hydroxide.

| Polymerization Charge | Yield, Gms. | Maximum capacity, meq./gm. dry H resin |
|---|---|---|
| 20.0 gms. p-vinylbenzenesulfonamide<br>60 gms. divinylbenzene solution (21%) | 16.0 | 1.80 |
| 20.2 gms. p-vinylbenzene-N,N'-dimethylsulfonamide<br>20.7 gms. divinylbenzene solution (21%) | 30.8 | 0.94 |
| 8.3 gms. n-butyl-p-vinylbenzene sulfonate<br>8.3 gms. divinylbenzene solution (21%) | 15.3 | 2.91 |
| 8.0 gms. n-propyl-p-vinylbenzene-sulfonate<br>2.0 gms. divinylbenzene solution (55.4%) | 8.0 | 1.94 |
| 21.4 gms. ethyl-p-vinylbenzene-sulfonate<br>8.5 gms. divinylbenzene solution (55.4%) | 23.6 | 3.12 |

EQUILIBRIUM QUOTIENT DETERMINATIONS

A sample of about 2 m. eq. of the hydrogen form of the resin was placed in a flask and the capacity determined by the addition of 2 N sodium chloride solution and titration with 0.1 N sodium hydroxide solution using bromcresol green as the indicator. The same sample after complete conversion to either the hydrogen or sodium form was equilibrated with solutions containing 0.1 N sodium chloride and 0.1 N hydrochloric acid solutions in various proportions. After equilibrium had been attained, the solution was analysed for sodium chloride by evaporation and for hydrochloric acid by titration. The resin sample was drained by suction, thoroughly rinsed, and the hydrogen ion on the resin determined as in the capacity determinations. The sodium ion on the resin was calculated from the difference between the hydrogen ion on the resin and the capacity. In all cases, equilibrium quotient values were obtained using resin initially in the hydrogen form and also using resin initially in the sodium form. Equilibrium quotients were also determined in a similar way on a sample of this butyl ester resin which had been sulfonated by treatment with sulfuric acid to a capacity of 4.87 m. eq. per gm.

The invention concerns preparing ion-exchange materials using as one of the monomers, a compound containing a grouping which can undergo addition polymerization and an ionogenic substituent group which may be, or may be converted to, an ion-exchange group after polymerization. The latter grouping may be, for example, sulfonic acid, sulfonyl chloride, sulfonamide, various sulfonic acid esters or salts and so on.

Examples of these types of monomers are as follows: Methyl, ethyl, propyl and Butyl esters of styrenesulfonic acid, the amide and dimethyl amide of styrenesulfonic acid, styrenesulfonic acid, salts of styrenesulfonic acid, styrenesulfonyl chloride. Esters, amides, salts, and acid chloride of various substituted styrenesulfonic acids.

Granular ion-exchange resins of the styrenesulfonic acid type are prepared with various low or high capacities in which the ion-exchange groups are substituted more or less homogeneously throughout the resin.

Films, membranes, tubes and pipes are prepared which have high ion transfer rates, low water leak, low anion leak and high tensile strength. Cross linking and capacity can be varied individually.

The ion exchange resins of the invention are made by methods which differ in the reactions used. The method of preparing the monomers has been set forth above. Accordingly, resins may be prepared according to the following:

PREPARATION OF GRANULAR ION-EXCHANGE RESINS

Monomer charges were prepared of various compositions as indicated in the following.

MONOMER CHARGE COMPOSITION

20–98% ionogenic monomer, e. g. propyl ester of styrenesulfonic acid
2–40% cross linking agent, e. g. divinylbenzene
0–72% diluent monomer, e. g. styrene
0–2% initiator or catalyst, e. g. benzoyl peroxide The monomer charge was suspended in water using a stabilizer, e. g. 0.1% hydroxyethyl cellulose. The polymerization was done in a suitable vessel of glass or metal and stirred at a rate adjusted to give beads of desired size. Temperatures between room temperature and about 100° C. could be used but it is preferred to maintain the temperature at 90° C. These conditions of stirring and temperature were maintained until polymerization was complete as determined by the gelation and eventual hardening of the suspended particles. The time required for a given polymerization is widely variable and dependent among other things on the purity of the monomers used. Accordingly, batches of monomer which had not polymerized within eight hours were discarded. Although the time required for polymerization was variable as stated above it tends to be shorter the higher the temperature and the greater the content of divinylbenzene in the charge.

Also the time required for the completion of the polymerization was frequently shorter when benzoyl peroxide was used than when it was omitted. Other variations in the composition of the monomer charge had little noticeable effect on the operation of polymerization.

After polymerization the beads of polymer were treated to produce the free ion-exchange groups from the ionogenic monomer. For example when the ionogenic monomer was the propyl ester of styrene sulfonic acid the beads were hydrolysed in water to which either acid (e. g. hydrochloric acid) or base (e. g. NaOH) was added. The preferred practice was to use 5% by weight solution of sodium hydroxide. Normally hydrolysis required 8 to 10 hours at the preferred temperatures of about 100° C. but in some cases as long as four weeks were required.

In a general way the time required for the hydrolysis was longer the greater the percent of cross linking agent in the charge and the smaller the percent of ionogenic monomer. The hydrolysis required longer time the greater the diameter of the ion-exchange beads. For some cases with charges containing less than 20% ionogenic monomer and high cross linking (10%) the hydrolysis was done on beads which were pre-swollen in a solvent (e. g. methyl ethyl ketone).

The ion-exchange resin properties are affected to some extent by variations in the monomer charge composition. In a general way the rate of ion-exchange is faster the higher the percentage of ionogenic monomer and the lower the percent of cross linking agent in the monomer charge.

The equilibrium constants for the sodium hydrogen exchange do not vary greatly from unity as shown previously but within this small range of variation the equilibrium constant shows an increasing resin preference for sodium ion at higher percent ionogenic monomer and higher percent of cross linking agent in the monomer charge.

The over-all yields of the products are high but are subject to variation depending on which ionogenic monomer is used. The rate of hydrolysis is also a function of the ionogenic monomer used.

Polymerizations of pure ionogenic monomer have been carried out by bulk polymerization which is simply the heating of the monomer with benzoyl peroxide in a suitable container.

PREPARATION OF ION-EXCHANGE MEMBRANES, PIPES, TUBES AND THE LIKE

One of the major difficulties encountered in the preparation of unsupported "homogeneous" ion-exchange membranes by the sulfonation of polystyrene films in the low tensile strengths which the products possess. The copolymerization of ester monomers with divinylbenzene permits the preparation of resins of relatively low capacity which have much higher tensile strength.

The specific manner of preparing an ion exchange membrane of the invention is set forth following:

Monomer charges were prepared of various compositions as indicated in the following.

MONOMER CHARGE COMPOSITION

20–60% ionogenic monomer, e. g. propylester of styrene sulfonic acid.
2–12% cross linking agent, e. g. divinylbenzene
30–75% diluent monomer, e. g. styrene
0.1–1% catalyst or initiator, e. g. benzoyl peroxide The monomer charge was mixed and placed in a vessel of suitable shape made of glass or metal e. g. stainless steel. The vessel was of such shape and dimensions relative to the amount of monomer charge that a thin film of liquid was formed in contact with relatively small vapour space. The temperature was adjusted between 50 and 150° C. (preferred practice about 90° C.) and after a time of about one hour the charge became polymerized. It should be noted that polymerization times are very variable and therefore there may be instances where polymerization may not occur.

After polymerization the sheets of polymer were treated to produce the free ion-exchange groups from the ionogenic monomer. For example when the ionogenic monomer comprised the propyl ester of styrene sulfonic acid the sheets were hydrolysed in water to which acid (e. g. hydrochloric acid) or base (e. g. NaOH) was added. The preferred practice was to use 5% by weight solution of sodium hydroxide. Normally hydrolysis required 8 to 10 hours at the preferred temperatures of about 100° C. but in some cases as long as four weeks were required.

In a general way the time required for the hydrolysis was longer the greater the percent of cross linking agent in the charge and the smaller the percent of ionogenic monomer.

The hydrolysis required longer time the greater the thickness of the ion-exchange sheet or membrane.

The ion-exchange resin properties are affected to some extent by variations in the monomer charge composition. In a general way the rate of ion-exchange is faster the higher the percent of ionogenic monomer and the lower the percent of cross linking agent in the monomer charge.

The equilibrium constants for the sodium hydrogen exchange do not vary greatly from unity as shown previously but within this small range of variation the equilibrium constant shows an increasing resin preference for sodium ion at higher percent ionogenic monomer and higher percent of cross linking agent in the monomer charge.

The properties of mass transfer rate and membrane potential for the films are functions of the monomer charge composition. Both of these properties are complex functions of the percent ionogenic monomer and the percent cross-linking in the monomer charge as may be ascertained from the table of data given previously.

In a general way it may be said that the transport of material both anionic and cationic is faster the lower the cross linking and the higher the capacity. In general it may be said that the membrane potential is increased the higher the cross linking and the lower the capacity. In general the tensile strength of the membrane increases with increasing cross linking and decreasing capacity.

The following tables list the properties of membranes and typical granulated resins of the invention.

TABLE I.—PROPERTIES OF ION EXCHANGE MEMBRANES

| A | B | C | D | E | F | G | H |
|---|---|---|---|---|---|---|---|
| 1-6 | 1.13 | 6 | .339 | 2,350 | .4462 | 8.75 | 99.55 |
| 1-4 | 1.22 | 4 | .386 | 2,010 | .9726 | 18.2 | 99.46 |
| 1-2 | 1.40 | 2 | .739 | 1,530 | 2.926 | 222.0 | 96.93 |
| 2-6A | 2.10 | 6 | .657 | ------ | 3.809 | 83.3 | 98.89 |
| 2-6B | 1.75 | 6 | .501 | ------ | 3.113 | ------ | 99.16 |
| 2-4 | 1.92 | 4 | .725 | 1,670 | 4.128 | 177.0 | 98.13 |
| 202 | 1.96 | 2 | 1.24 | 970 | 6.093 | 575.0 | 94.67 |
| 3-6A | 2.65 | 6 | .881 | 1,450 | 6.336 | 157.0 | 98.62 |
| 3-6B | 2.56 | 6 | .823 | ------ | 5.833 | 156.0 | 98.92 |
| 304 | 2.72 | 4 | 1.25 | 1,270 | 6.485 | 502.0 | 97.23 |
| 3-2 | 2.94 | 2 | 2.14 | 89.5 | 7.434 | 2,150.0 | 91.06 |

A = Film number.
B = Capacity in m.gm.eq. per gm.
C = Nominal cross linking as mole percent D.V.B.
D = Moisture content at 100% R.H. gm./gm. dry H+ form.
E = Yield Strength, lbs./in.$^2$
F = Mass transfer coefficients for Na+—H+cm.$^2$/sec.×10$^5$.
G = Mass transfer coefficients for Cl−—NO$_3$−cm.$^2$/sec.×10$^9$.
H = Membrane potential as percent of theoretical for zero anion transfer.

TABLE II.—TYPICAL GRANULATED EXCHANGE RESINS

| | Yield, gms. | Maximum Capacity, meq./gm. dry H resin |
|---|---|---|
| 20.0 gms. p-vinylbenzenesulfonamide 60 gms. divinylbenzene solution (21%) | 16.0 | 1.80 |
| 20.2 gms. p-vinylbenzene-N,N′-dimethylsulfonamide 20.7 gms. divinylbenzene solution (21%) | 30.8 | 0.94 |
| 8.3 gms. n-butyl-p-vinylbenzenesulfonate 8.3 gms. divinylbenzene solution (21%) | 15.3 | 2.91 |
| 8.0 gms. n-propyl-p-vinylbenzene-sulfonate 2.0 gms. divinylbenzene solution (55.4%) | 8.0 | 1.94 |

TABLE III.—PROPERTIES OF GRANULAR RESIN

| A | B | C | D |
|---|---|---|---|
| | meq./cm. | | |
| 25% | 4.00 | 0.98 | 0.95 | .538 gm./gm. B.D.—H+($^1$). |
| 17% | 2.91 | 0.900 | 0.835 | .10 gm./gm. B.D.—H+. |
| 4% | 1.92 | 1.01 | 0.865 | .725 gm./gm. B.D.—H+. |
| 20% | 4.31 | 1.07 | 0.97 | .50 gm./gm. B.D.—H+. |

A = Nominal cross linking as mole percent D.V.B.
B = Capacity in m.gm.eq. per gm.
C = Sodium hydrogen equilibrium quotient range for $X_{N a R}$=0.2 to 0.8.
D = Approximate moisture content at 90% R.H. 25° C. in gm. water per gm. dry H+ form of resin.
$^1$ Bone dry hydrogen form.

One of the main features of the equilibrium data obtained for the ester resin is that the equilibrium quotients are more nearly constant than those reported in the literature for sulfonated polystyrene resins of comparable cross-linking.

The ion exchange resins of the invention have properties which differ considerably from the properties of resins prepared by the sulfonation of cross-linked polymers as contrasted with those of the invention prepared by the method set forth.

The cross-linked polystyrene sulfonic ion exchange resins of the invention have a relatively low ion exchange capacity and are characterized by a relatively homogeneous structure in which the sulfonate groups are distributed throughout the resin. Unsupported ion exchange films of high tensile strength may thus be prepared by the process of the invention. It is to be noted also that the equilibrium quotients for the sodium hydrogen exchange on resins prepared from the ester monomer are lower and more constant than values reported for similar resins prepared by the sulfonation of cross-linked polystyrene.

The range of the monomer charge compositions and other quantitative disclosure set forth herein is derived from actual practice of the invention and is not intended to be all-embracing as to the limits to which a particular ingredient may occur but rather, sets forth a preferred range of practice. Accordingly, it is intended that the present disclosure be construed to embody those limits of practice of the invention falling within the scope of one skilled in the art.

What I claim as my invention is:

1. The method of preparing ion exchange membranes which comprises charging a suitable reaction vessel with a monomer charge spread as a thin film of liquid on a surface of said reaction vessel, said charge comprising a divinyl aromatic hydrocarbon mixed with a monovinyl aromatic hydrocarbon capable of copolymerization therewith and at least one ionogenic monomer selected from the group consisting of styrene sulphonic esters and amides, said monovinyl aromatic hydrocarbon constituting at least 30% of the charge, effecting polymerization of the said charge, and subjecting the membrane thus produced to hydrolysis to free the ion exchange groups from the copolymerized ionogenic monomer contained therein.

2. The method defined in claim 1 wherein the monovinyl aromatic hydrocarbon is styrene, the divinyl aromatic hydrocarbon is divinyl benzene and the ionogenic monomer is a lower alkyl ester of styrene sulfonic acid.

3. An ion-exchange membrane prepared by the process defined in claim 1.

4. An ion-exchange membrane prepared by the method defined in claim 2.

References Cited in the file of this patent

UNITED STATES PATENTS

| 2,527,300 | Dudley | Oct. 24, 1950 |
| 2,616,917 | Coover et al. | Nov. 4, 1952 |
| 2,618,655 | Dickey | Nov. 18, 1952 |
| 2,675,371 | Coover | Apr. 13, 1954 |
| 2,697,079 | D'Alelio | Dec. 14, 1954 |
| 2,697,080 | D'Alelio | Dec. 14, 1954 |
| 2,733,231 | Bauman | Jan. 31, 1956 |
| 2,756,202 | Clarke | July 24, 1956 |

OTHER REFERENCES

Wiley et al.: Journal of American Chemical Society, vol. 76, pages 720 to 723, Feb. 25, 1954.